(12) United States Patent
Wu

(10) Patent No.: US 11,748,121 B2
(45) Date of Patent: Sep. 5, 2023

(54) METHOD, SYSTEM, DEVICE AND MEDIUM FOR ADAPTIVE CONFIGURATION OF A USER INTERFACE EMPLOYING STRETCHING AND MOVING

(71) Applicant: SHANGHAI LILITH TECHNOLOGY CORPORATION, Shanghai (CN)

(72) Inventor: Di Wu, Shanghai (CN)

(73) Assignee: SHANGHAI LILITH TECHNOLOGY CORPORATION, Shanghai (CN)

( * ) Notice: Subject to any disclaimer, the term of this patent is extended or adjusted under 35 U.S.C. 154(b) by 0 days.

(21) Appl. No.: 17/609,680

(22) PCT Filed: Sep. 25, 2019

(86) PCT No.: PCT/CN2019/107840
§ 371 (c)(1),
(2) Date: Nov. 8, 2021

(87) PCT Pub. No.: WO2020/228221
PCT Pub. Date: Nov. 19, 2020

(65) Prior Publication Data
US 2022/0214893 A1 Jul. 7, 2022

(30) Foreign Application Priority Data
May 10, 2019 (CN) .......................... 201910392292.0

(51) Int. Cl.
*G06F 9/451* (2018.01)
*G06F 3/0484* (2022.01)
(52) U.S. Cl.
CPC ............ *G06F 9/451* (2018.02); *G06F 3/0484* (2013.01)

(58) Field of Classification Search
CPC ............................... G06F 3/0484; G06F 9/451
See application file for complete search history.

(56) References Cited

U.S. PATENT DOCUMENTS 7,173,666 B1 * 2/2007 Masaki ................. H04N 9/641
348/700
10,496,727 B1 * 12/2019 Kennedy, Jr. ......... G06F 16/958
(Continued)

FOREIGN PATENT DOCUMENTS

| CN | 104182270 A | 12/2014 |
| CN | 105760146 A | 7/2016 |

(Continued)

OTHER PUBLICATIONS

"H5 game development: horizontal screen adaptation," by Tingglelaoo, retrieved from https://zhuanlan.zhihu.com/p/30577906 on Dec. 17, 2022. Original Chinese publication (Dec. 14, 2017) (Year: 2017).*

(Continued)

*Primary Examiner* — Eric J. Bycer
(74) *Attorney, Agent, or Firm* — AMSTER ROTHSTEIN & EBENSTEIN LLP

(57) ABSTRACT

The present invention relates to a technical field of user interface display, and in particular to a method, system, and device for adaptive configuration of a user interface, and a medium. The method of the present invention includes: respectively making a correspondence between one or more user interface components and one area of a plurality of areas of a panel; performing a stretching operation on the plurality of areas and the one or more user interface components, and performing a moving operation on the plurality of areas, to generate an adaptive panel and one or more adaptive user interface components adapted to user equipment; and respectively placing the one or more adaptive user interface components in corresponding areas of the adaptive panel to generate an adaptive user interface. The present (Continued)

invention simplifies design steps of user interface, enhances operability, and implements adaptive configuration of the user interface.

8 Claims, 5 Drawing Sheets

(56) References Cited

U.S. PATENT DOCUMENTS

| | | | | |
|---|---|---|---|---|
| 2004/0056894 A1* | 3/2004 | Zaika | ............... | G06F 9/454 |
| | | | | 715/762 |
| 2005/0237321 A1* | 10/2005 | Young | ............... | G06T 11/60 |
| | | | | 715/764 |
| 2006/0107201 A1* | 5/2006 | Chien-Fa | ............ | G06F 16/84 |
| | | | | 715/239 |
| 2006/0117253 A1* | 6/2006 | Polash | ............. | G06F 40/103 |
| | | | | 715/234 |
| 2014/0368547 A1* | 12/2014 | Elings | ............ | G06F 3/0346 |
| | | | | 345/659 |
| 2015/0205497 A1 | 7/2015 | Fraser | | |
| 2017/0102927 A1* | 4/2017 | Gunther, Jr. | .......... | G06F 8/38 |

FOREIGN PATENT DOCUMENTS

| | | | | |
|---|---|---|---|---|
| CN | 107273000 A | | 10/2017 | |
| CN | 107515751 A | * | 12/2017 | ............ A63F 13/52 |
| CN | 108363604 A | | 8/2018 | |
| CN | 109254813 A | | 1/2019 | |

OTHER PUBLICATIONS

"H5 game development: horizontal screen adaptation," by Tingglelaoo, retrieved from https://zhuanlan.zhihu.com/p/30577906 on Dec. 17, 2022. (published Dec. 14, 2017), Machine translations in Portrait orientation (15 pgs) and Landscape orientation (35 pgs) (see Office Action for details) (Year: 2017).*

International Search Report, dated Jan. 23, 2020 in corresponding International Application No. PCT/CN2019/107840.

* cited by examiner

METHOD, SYSTEM, DEVICE AND MEDIUM FOR ADAPTIVE CONFIGURATION OF A USER INTERFACE EMPLOYING STRETCHING AND MOVING

CROSS REFERENCE TO RELATED APPLICATIONS

This application is a national phase of PCT application No. PCT/CN2019/107840, filed Sep. 25, 2019, which claims priority to Chinese patent application No. 201910392292.0 filed on May 10, 2019, all of which are incorporated herein by reference thereto.

TECHNICAL FIELD

The present invention relates to a technical field of user interface display, and in particular to a method, system, and device for adaptive configuration of a user interface, and a medium.

BACKGROUND

When designing a user interface, user interface designers need to consider various possibilities to adapt the user interface to multiple devices of multiple users since the multiple devices of the multiple users usually have different resolutions. In this case, a lot of work costs are consumed.

In the existing solution, an available area is usually set first, and then different user interface logics are designed for different resolutions in the available area. In the existing user interface configuration process, various boundary issues need to be considered, and consequently design steps of user interface are cumbersome, operability is poor, and adaptive configuration of the user interface cannot be implemented.

SUMMARY

An objective of the present invention is to provide a method, system, and device for adaptive configuration of a user interface, and a medium, to simplify design steps of user interface, enhance operability, and implement adaptive configuration of the user interface.

The present invention discloses a method for adaptive configuration of a user interface, the user interface includes a panel and one or more user interface components placed on the panel, and the method includes:
  respectively making a correspondence between the one or more user interface components and one area of a plurality of areas of the panel;
  performing a stretching operation on the plurality of areas and the one or more user interface components, and performing a moving operation on the plurality of areas, to generate an adaptive panel and one or more adaptive user interface components adapted to user equipment; and
  respectively placing the one or more adaptive user interface components in corresponding areas of the adaptive panel to generate an adaptive user interface.

Optionally, the panel has N×M areas arranged in a manner of N×M, wherein N and M are both positive integers.

Optionally, the respectively making a correspondence between the one or more user interface components and one area of a plurality of areas of the panel includes: according to every center point of each user interface component, making a correspondence between the each user interface component and an area in which the center point is located.

Optionally, the performing a stretching operation on the plurality of areas and the one or more user interface components, and performing a moving operation on the plurality of areas, to generate an adaptive panel and one or more adaptive user interface components adapted to user equipment includes:
  obtaining a panel height and a panel width of the panel;
  obtaining a screen height and a screen width of the user equipment;
  calculating a stretching ratio, wherein the stretching ratio is a smaller value in a ratio of the screen height to the panel height and a ratio of the screen width to the panel width;
  performing a stretching operation on the plurality of areas and the one or more user interface components according to the stretching ratio;
  if the ratio of the screen height to the panel height is less than the ratio of the screen width to the panel width, moving the leftmost column area to the left to a screen edge of the user equipment, and moving the rightmost column area to the right to a screen edge of the user equipment, to generate an adaptive panel and one or more adaptive user interface components adapted to the user equipment; and
  if the ratio of the screen height to the panel height is greater than the ratio of the screen width to the panel width, moving the first row area up to a screen edge of the user equipment, and moving the last row area down to a screen edge of the user equipment, to generate an adaptive panel and one or more adaptive user interface components adapted to the user equipment.

Optionally, the respectively placing the one or more adaptive user interface components in corresponding areas of the adaptive panel to generate an adaptive user interface includes:
  when the correspondence between the one or more user interface components and one area of the plurality of areas of the panel is respectively made, determining a positional relationship between every center point of each user interface component and a corresponding area; and
  according to the positional relationship, placing every center point of each adaptive user interface component in a corresponding area of the adaptive panel to generate the adaptive user interface.

The present invention discloses a system for adaptive configuration of a user interface, the user interface includes a panel and one or more user interface components placed on the panel, and the system includes:
  a component correspondence module, configured to respectively make a correspondence between the one or more user interface components and one area of a plurality of areas of the panel;
  a stretching and moving module, configured to: perform a stretching operation on the plurality of areas and the one or more user interface components, and perform a moving operation on the plurality of areas, to generate an adaptive panel and one or more adaptive user interface components adapted to user equipment; and
  an interface generation module, configured to respectively place the one or more adaptive user interface components in corresponding areas of the adaptive panel to generate an adaptive user interface.

Optionally, the panel has N×M areas arranged in a manner of N×M, wherein N and M are both positive integers.

Optionally, the component correspondence module is configured to: according to every center point of each user interface component, make a correspondence between the each user interface component and an area in which the center point is located.

Optionally, the stretching and moving module is configured to: obtain a panel height and a panel width of the panel; obtain a screen height and a screen width of the user equipment; calculate a stretching ratio, wherein the stretching ratio is a smaller value in a ratio of the screen height to the panel height and a ratio of the screen width to the panel width; perform a stretching operation on the plurality of areas and the one or more user interface components according to the stretching ratio; if the ratio of the screen height to the panel height is less than the ratio of the screen width to the panel width, move the leftmost column area to the left to a screen edge of the user equipment, and move the rightmost column area to the right to a screen edge of the user equipment, to generate an adaptive panel and one or more adaptive user interface components adapted to the user equipment; and if the ratio of the screen height to the panel height is greater than the ratio of the screen width to the panel width, move the first row area up to a screen edge of the user equipment, and move the last row area down to a screen edge of the user equipment, to generate an adaptive panel and one or more adaptive user interface components adapted to the user equipment.

Optionally, the component correspondence module is configured to: when the correspondence between the one or more user interface components and one area of the plurality of areas of the panel is respectively made, determine a positional relationship between every center point of each user interface component and a corresponding area; and the interface generation module is configured to: according to the positional relationship, place every center point of each adaptive user interface component in a corresponding area of the adaptive panel to generate the adaptive user interface.

The present invention discloses a device for adaptive configuration of a user interface, the device includes a memory storing a computer-executable instruction and a processor, the processor is configured to execute the instruction to implement a method for adaptive configuration of a user interface, the user interface includes a panel and one or more user interface components placed on the panel, and the method includes:

respectively making a correspondence between the one or more user interface components and one area of a plurality of areas of the panel;

performing a stretching operation on the plurality of areas and the one or more user interface components, and performing a moving operation on the plurality of areas, to generate an adaptive panel and one or more adaptive user interface components adapted to user equipment; and respectively placing the one or more adaptive user interface components in corresponding areas of the adaptive panel to generate an adaptive user interface.

The present invention discloses a computer storage medium coded with a computer program, the computer program includes an instruction, the instruction is executed by more than one computer to implement a method for adaptive configuration of a user interface, the user interface includes a panel and one or more user interface components placed on the panel, and the method includes:

respectively making a correspondence between the one or more user interface components and one area of a plurality of areas of the panel;

performing a stretching operation on the plurality of areas and the one or more user interface components, and performing a moving operation on the plurality of areas, to generate an adaptive panel and one or more adaptive user interface components adapted to user equipment; and respectively placing the one or more adaptive user interface components in corresponding areas of the adaptive panel to generate an adaptive user interface.

Main differences and effects of the embodiments of the present invention relative to the prior art are as follows:

In the present invention, a user interface designer can add and modify user interface components on a panel with a uniform resolution by using component correspondence steps, stretching and moving steps, and interface generation steps, to generate a basic user interface. In this way, design steps of user interface are simplified, there is no need to consider too many boundary issues, operability is enhanced, and user interface adaptive configuration can be implemented according to user equipment.

DETAILED DESCRIPTION OF EMBODIMENTS

In the following description, many technical details are proposed in order to enable readers to better understand this application. However, a person of ordinary skill in the art can understand that even without these technical details and various changes and modifications based on the following embodiments, technical solutions protected by claims of this application can be implemented.

In order to make objectives, technical solutions and advantages of the present invention clearer, embodiments of the present invention are described in further detail below with reference to accompanying drawings.

When a user interface is designed, a user interface designer can add and modify user interface components on a panel with a uniform resolution to generate a basic user interface (hereinafter referred to as a user interface).

Figure 1A:
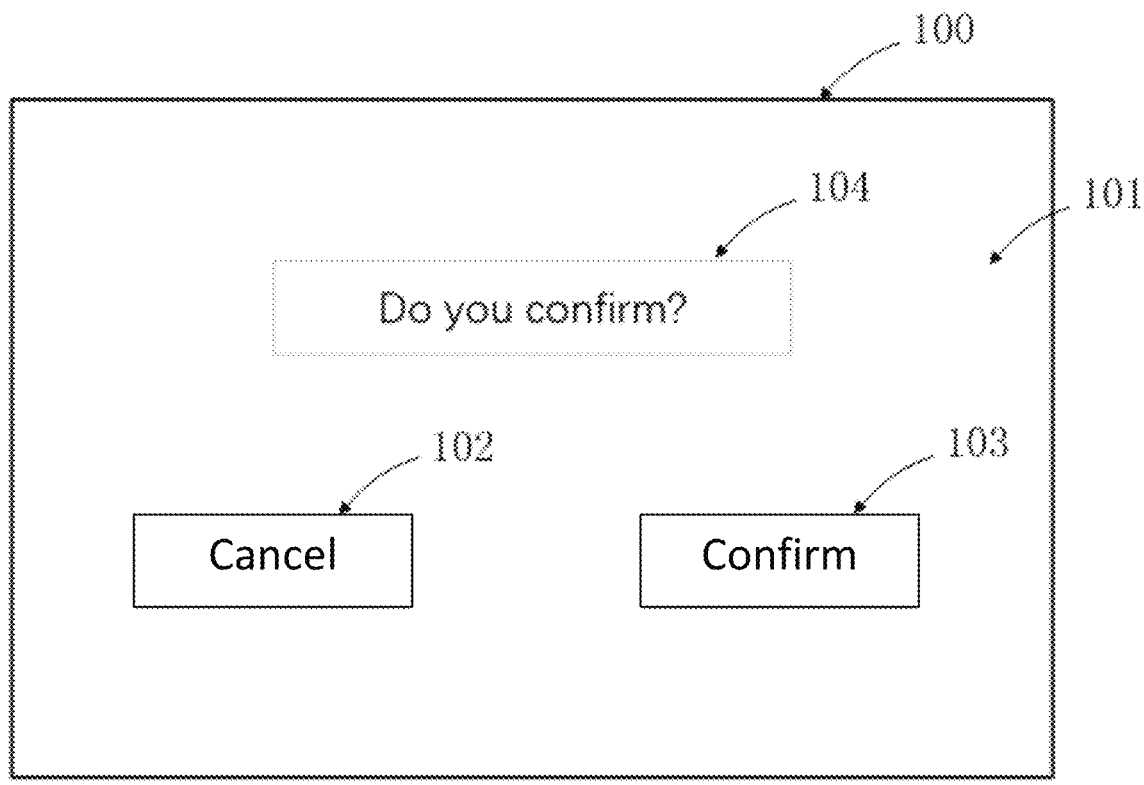
FIGS. 1A-1H are schematic diagrams of adaptive configuration of a user interface.

FIGS. 1A-1H are schematic diagrams of adaptive configuration of a user interface. As shown in FIG. 1A, a user interface 100 is a confirmation box, and includes a panel 101, and three user interface components 102, 103, 104 placed on the panel 101.

Optionally, the user interface 100 may include information of the user interface components 102, 103, 104 such as ID, category, color, size, content, and position. For example, the information of the user interface components 102, 103, 104 is recorded in a table:

| ID | User interface component category | Color | Size | Content | Position |
| --- | --- | --- | --- | --- | --- |
| 1 | Button | Red | 30*10 | Cancel | 30, 30 |
| 2 | Button | Blue | 30*10 | Confirm | 70, 30 |
| 3 | Text | Black | 50*10 | Do you confirm? | 50, 70 |

Figure 2:
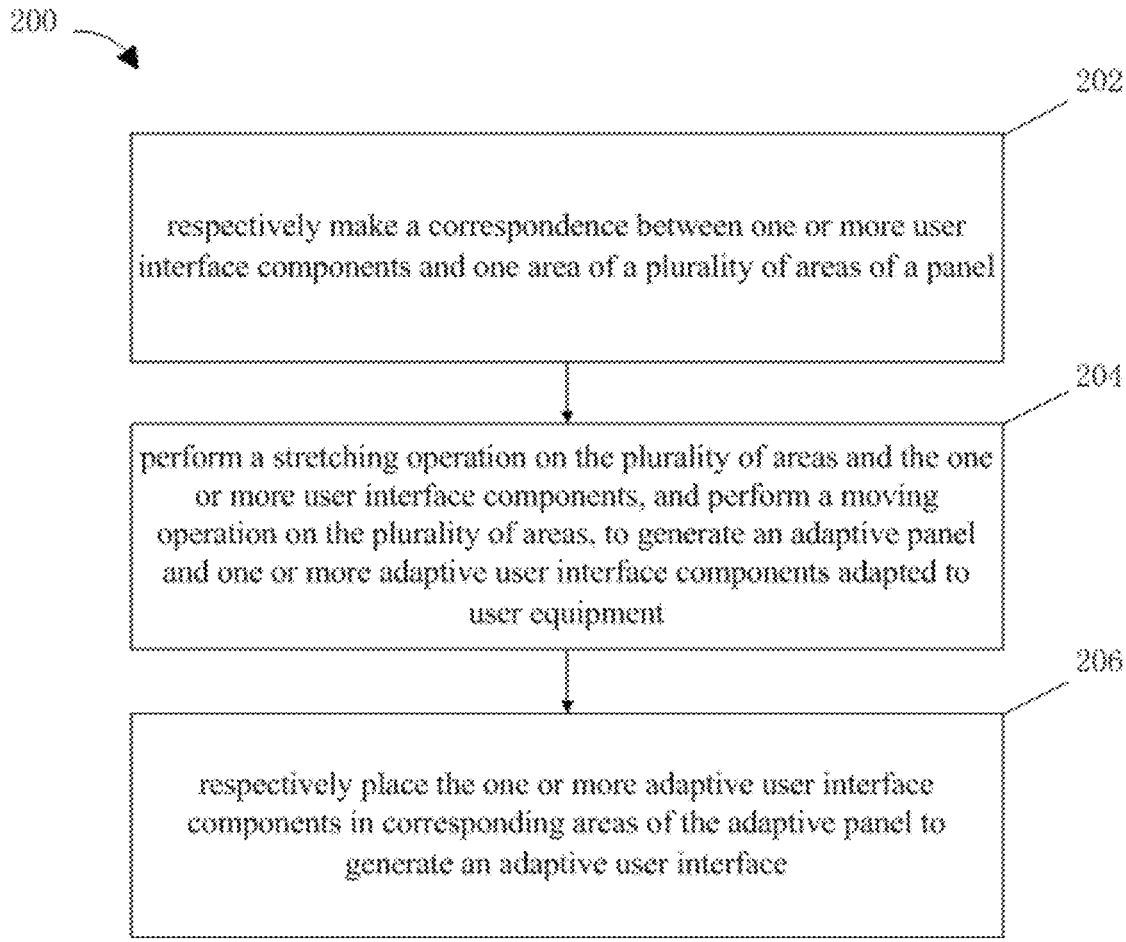
FIG. 2 is a schematic flowchart of a method for adaptive configuration of a user interface.

A first embodiment of the present invention relates to a method for adaptive configuration of a user interface. FIG. 2 is a schematic flowchart of a method for adaptive configuration of a user interface.

As shown in FIG. 2, a method 200 includes the following steps:

Step 202: Respectively make a correspondence between one or more user interface components and one area of a plurality of areas.

Optionally, the panel includes N×M areas arranged in a manner of N×M, wherein N and M are both positive integers, and N and M can be the same or different.

Optionally, the panel has nine areas arranged in a manner of 3×3. The panel can be divided into a leftmost column area, a middle column area, and a rightmost column area, and a first row area, a middle row area, and a last row area through this division, so that a moving operation can be performed on the leftmost column area and the rightmost column area or the first row area and the last row area in the following steps, while the position of the middle column area or the middle row area can be kept unchanged.

Optionally, sizes of the plurality of areas may be the same or different.

Optionally, the plurality of areas may be regular shapes or irregular shapes.

Figure 1B:
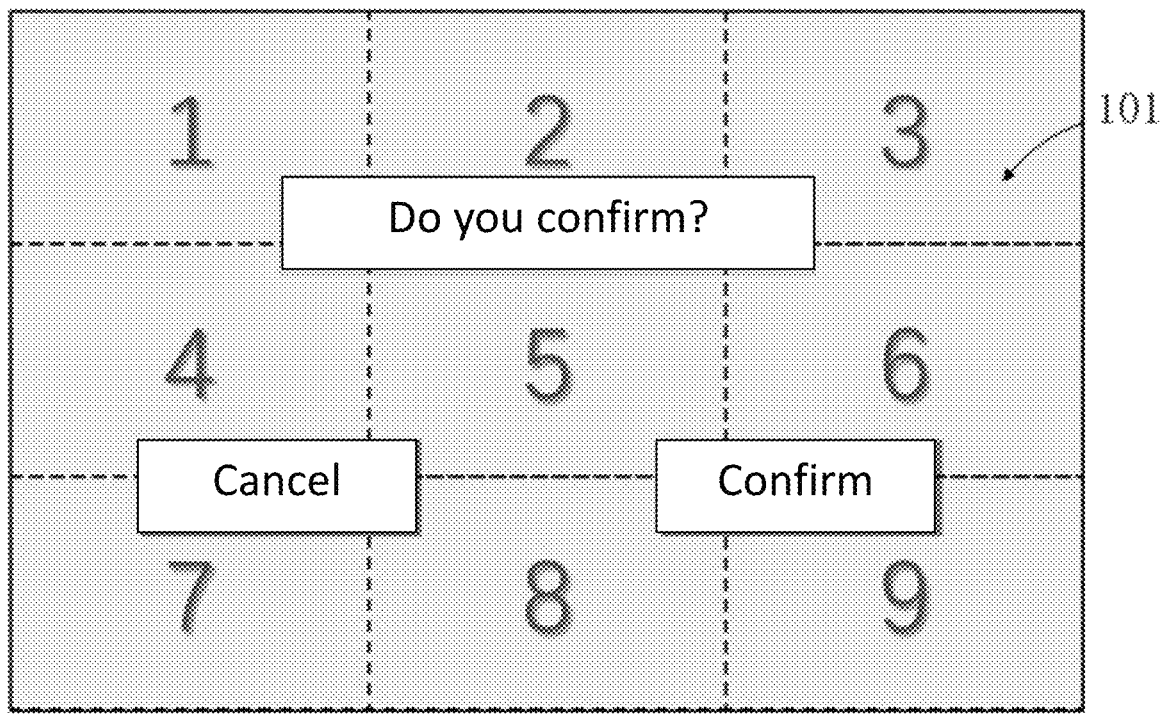

As shown in FIG. 1B, the panel 101 has nine areas arranged in a manner of 3×3, and the nine areas are respectively numbered by 1-9.

Optionally, according to every center point of each user interface component, a correspondence between the each user interface component and an area in which the center point is located is made. If a center point of a user interface component is on a common boundary of the plurality of areas, a component correspondence rule can be set or according to an instruction of a user to make a correspondence between the user interface component and one area in the plurality of areas of the panel.

Optionally, according to a positioning point of each user interface component, a correspondence between the each user interface component and an area in which the positioning point is located is made. The positioning point is any point of the user interface component.

Optionally, according to an instruction of a user, a correspondence between one or more user interface components and one area of a plurality of areas of the panel is respectively made, wherein the one area is any area of the plurality of areas, so that the user interface can be customized in a more advanced way.

Figure 1C:
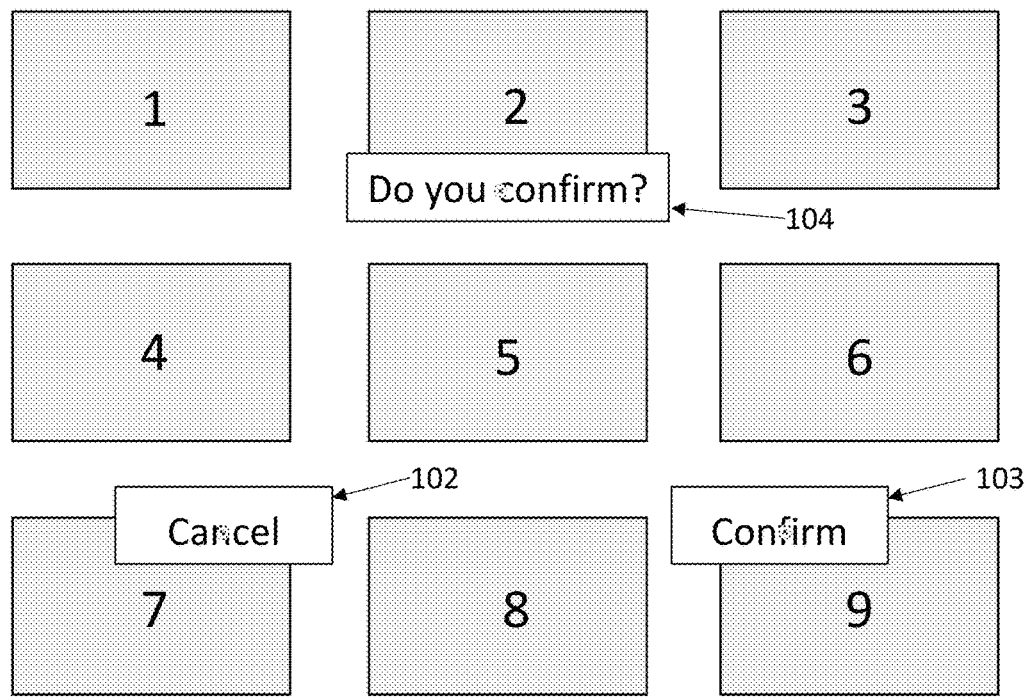

As shown in FIG. 1C, according to a center point of the user interface component 102, a correspondence between the user interface component 102 and an area 7 in which the center point is located is made; according to a center point of the user interface component 103, a correspondence between the user interface component 103 and an area 9 in which the center point is located is made; according to a center point of the user interface component 104, a correspondence between the user interface component 104 and an area 2 in which the center point is located is made.

Through step 202, the panel can have a plurality of areas, so that stretching and moving operations can be performed on all or some of the areas selected in the following steps. Compared with that an adaptation operation is performed by using the panel as a whole, different adaptation operations can be performed on a central area and an edge area of the panel in this application. In addition, the correspondence between the one or more user interface components and one area of the plurality of areas of the panel can be respectively made, so that one or more adaptive user interface components can be respectively placed in corresponding areas of an adaptive panel in the following steps, to generate an adaptive user interface. The one or more adaptive user interface components in the adaptive user interface and the one or more user interface components in the user interface can be placed in the same corresponding areas.

Step 204: Perform a stretching operation on the plurality of areas and the one or more user interface components, and perform a moving operation on the plurality of areas, to generate an adaptive panel and one or more adaptive user interface components adapted to user equipment.

Optionally, a panel height and a panel width of the panel are obtained; a screen height and a screen width of the user equipment are obtained; a stretching ratio is calculated, wherein the stretching ratio is a smaller value in a ratio of the screen height to the panel height and a ratio of the screen width to the panel width; a stretching operation is performed on the plurality of areas and the one or more user interface components according to the stretching ratio; if the ratio of the screen height to the panel height is less than the ratio of the screen width to the panel width, the leftmost column area is moved to the left to a screen edge of the user equipment, and the rightmost column area is moved to the right to a screen edge of the user equipment, to generate an adaptive panel and one or more adaptive user interface components adapted to the user equipment; and if the ratio of the screen height to the panel height is greater than the ratio of the screen width to the panel width, the first row area is moved up to a screen edge of the user equipment, and the last row area is moved down to a screen edge of the user equipment, to generate an adaptive panel and one or more adaptive user interface components adapted to the user equipment.

Optionally, if the ratio of the screen height to the panel height is equal to the ratio of the screen width to the panel width, the moving operation is not performed on the plurality of areas.

Figure 1D:
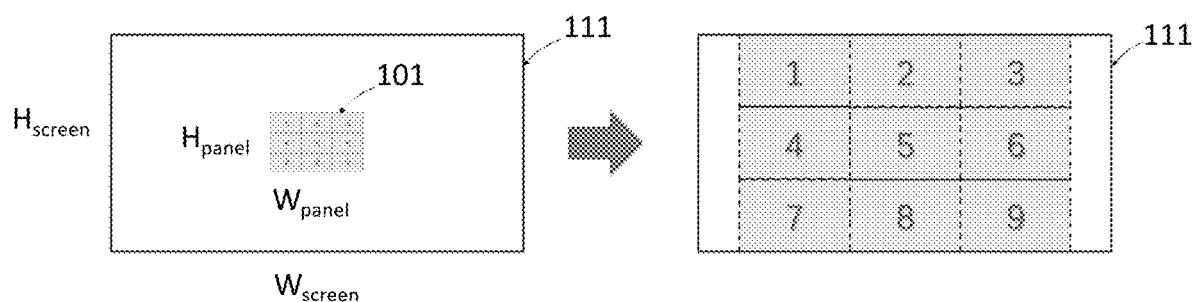

As shown in FIG. 1D, a panel height $H_{panel}$ and a panel width $W_{panel}$ of the panel 101 are obtained; a screen height $H_{screen}$ and a screen width $W_{screen}$ of a screen 111 of the user equipment are obtained; a stretching ratio is calculated, wherein the stretching ratio is a smaller value in a ratio of the screen height $H_{screen}$ to the panel height $H_{panel}$ and a ratio of the screen width $W_{screen}$ to the panel width $W_{panel}$; and a stretching operation is performed on the nine areas 1-9 according to the stretching ratio.

In addition, not shown in FIG. 1D, a stretching operation is performed on the three user interface components 102, 103, 104 according to the stretching ratio, to generate three adaptive user interface components 102', 103', 104'.

Figure 1E:
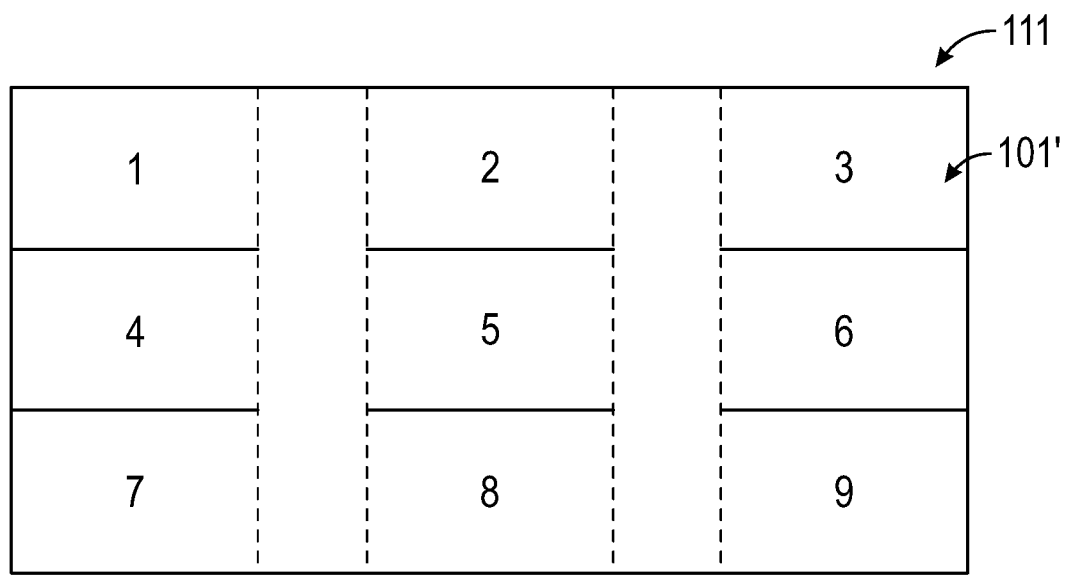

As shown in FIG. 1E, if the ratio of the screen height $H_{screen}$ to the panel height $H_{panel}$ is smaller than the ratio of the screen width $W_{screen}$ to $W_{panel}$, W the panel width leftmost column areas 1, 4, 7 are moved to the left to an edge of the screen 111 of the user equipment, and rightmost column areas 3, 6, 9 are moved to the right to an edge of the screen 111 of the user equipment to generate an adaptive panel 101'.

Figure 1F:
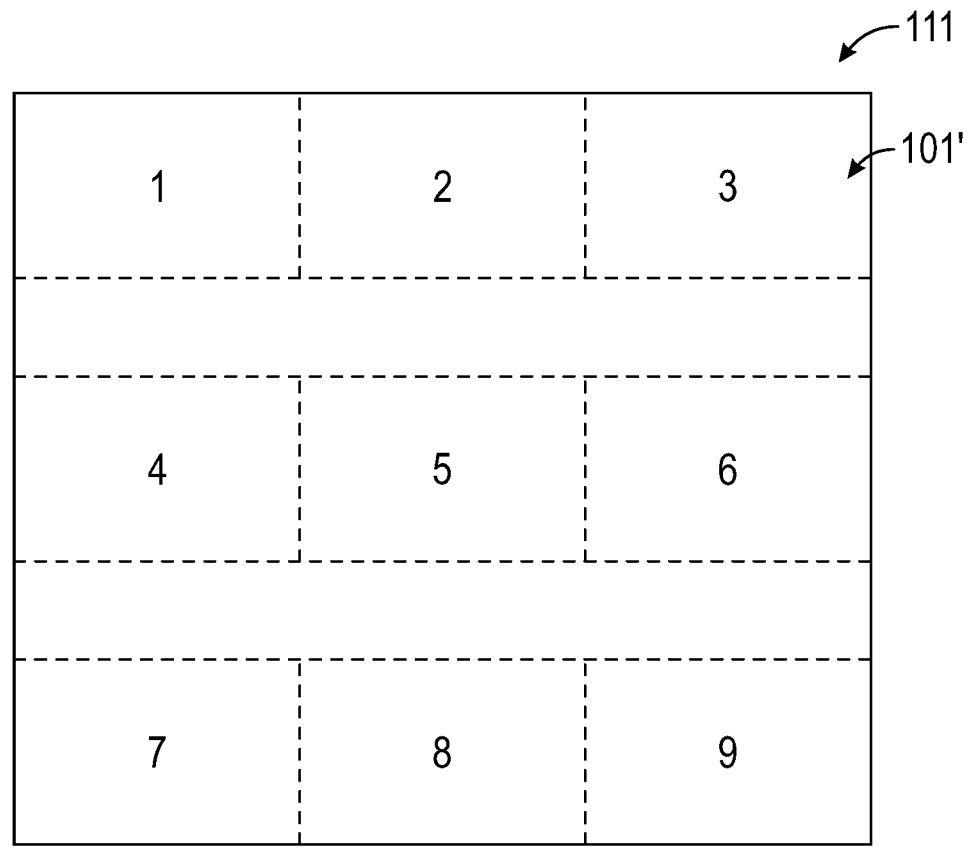

As shown in FIG. 1F, if the ratio of the screen height $H_{screen}$ to the panel height $H_{panel}$ is greater than the ratio of the screen width $W_{screen}$ to the panel width $W_{panel}$, first row areas 1, 2, and 3 are moved up to an edge of the screen 111 of the user equipment, and last row areas 7, 8, and 9 are moved down to an edge of the screen 111 of the user equipment to generate an adaptive panel 101'.

Through step 204, an adaptive panel and one or more adaptive user interface components adapted to user equipment can be generated. Compared with the existing user interface configuration, in this application, only the ratio of the screen height $H_{screen}$ to the panel height $H_{panel}$ and the ratio of the screen width $W_{screen}$ to the panel width $W_{panel}$ need to be calculated, and only the stretching operation and the moving operation are required. In this way, there is no need to consider too many boundary issues, operability is enhanced, and self-adaptive configuration of user interface can be implemented according to the user equipment.

Step 206: Respectively place the one or more adaptive user interface components in corresponding areas of the adaptive panel, to generate an adaptive user interface.

Optionally, when the correspondence between the one or more user interface components and one area in the plurality of areas of the panel is respectively made, a positional relationship between every center point of each user interface component and a corresponding area is determined; and according to the positional relationship, every center point of each adaptive user interface component is placed in a corresponding area of the adaptive panel to generate an adaptive user interface.

Optionally, the positional relationship between the center point and the corresponding area may refer to percentage coordinates of the center point in the corresponding area. For example, percentage coordinates of a center point are (50% $W_{corresponding\ area}$, 10% $H_{corresponding\ area}$), that is, the center point is obtained by taking a point at the lower left corner of the corresponding area as an origin point, moving to the right by 50% $W_{corresponding\ area}$, and then moving up by 10% $H_{corresponding\ area}$, wherein $W_{corresponding\ area}$ is the width of the corresponding area, and $H_{corresponding\ area}$ is the height of the corresponding area. After a stretching operation is performed on the plurality of areas and the one or more user interface components, the percentage coordinates can be kept unchanged.

Optionally, when the correspondence between the one or more user interface components and one area of the plurality of areas of the panel is respectively made, a positional relationship between a positioning point of each user interface component and a corresponding area is determined; and according to the positional relationship, every positioning point of each adaptive user interface component is placed in a corresponding area of the adaptive panel to generate an adaptive user interface. Similar to the positional relationship between the center point and the corresponding area discussed above, the positional relationship between the positioning point and the corresponding area can be determined.

Optionally, when the correspondence between the one or more user interface components and one area in the plurality of areas of the panel is respectively made according to an instruction of a user, a positional relationship between every center point or every positioning point of each user interface component and a corresponding area can be determined; and according to the positional relationship, every center point or every positioning point of each adaptive user interface component is placed in a corresponding area of the adaptive panel to generate an adaptive user interface.

Optionally, according to an instruction of a user, one or more adaptive user interface components are respectively placed in one area of the adaptive panel to generate an adaptive user interface, wherein the one area is any area in the plurality of areas, so that the adaptive user interface can be customized in a more advanced way.

Figure 1G:
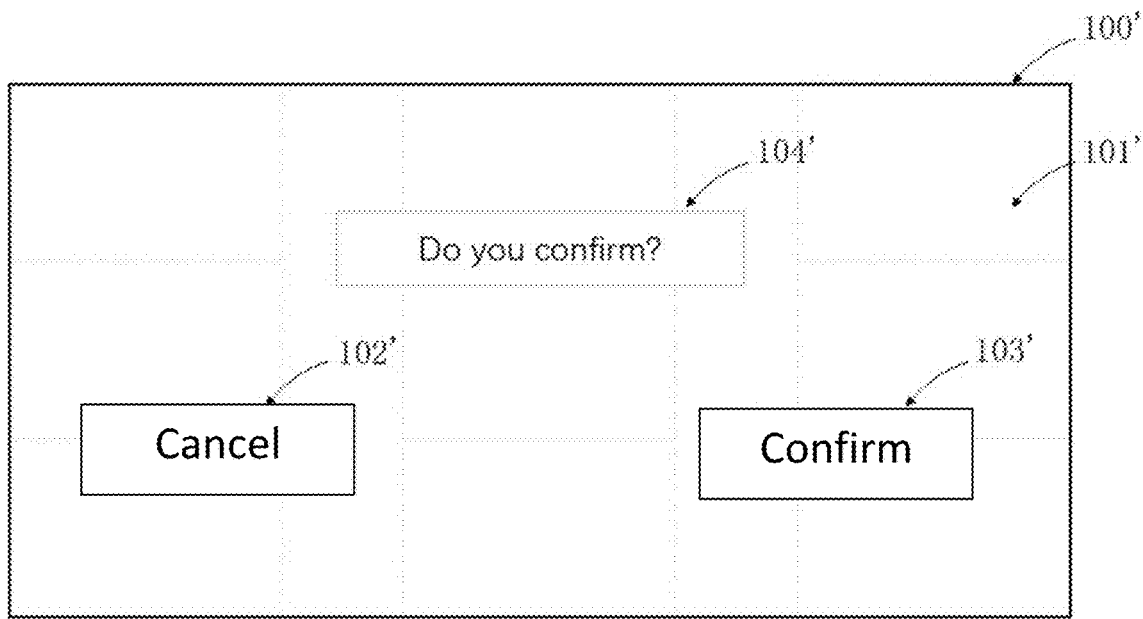
Figure 1H:
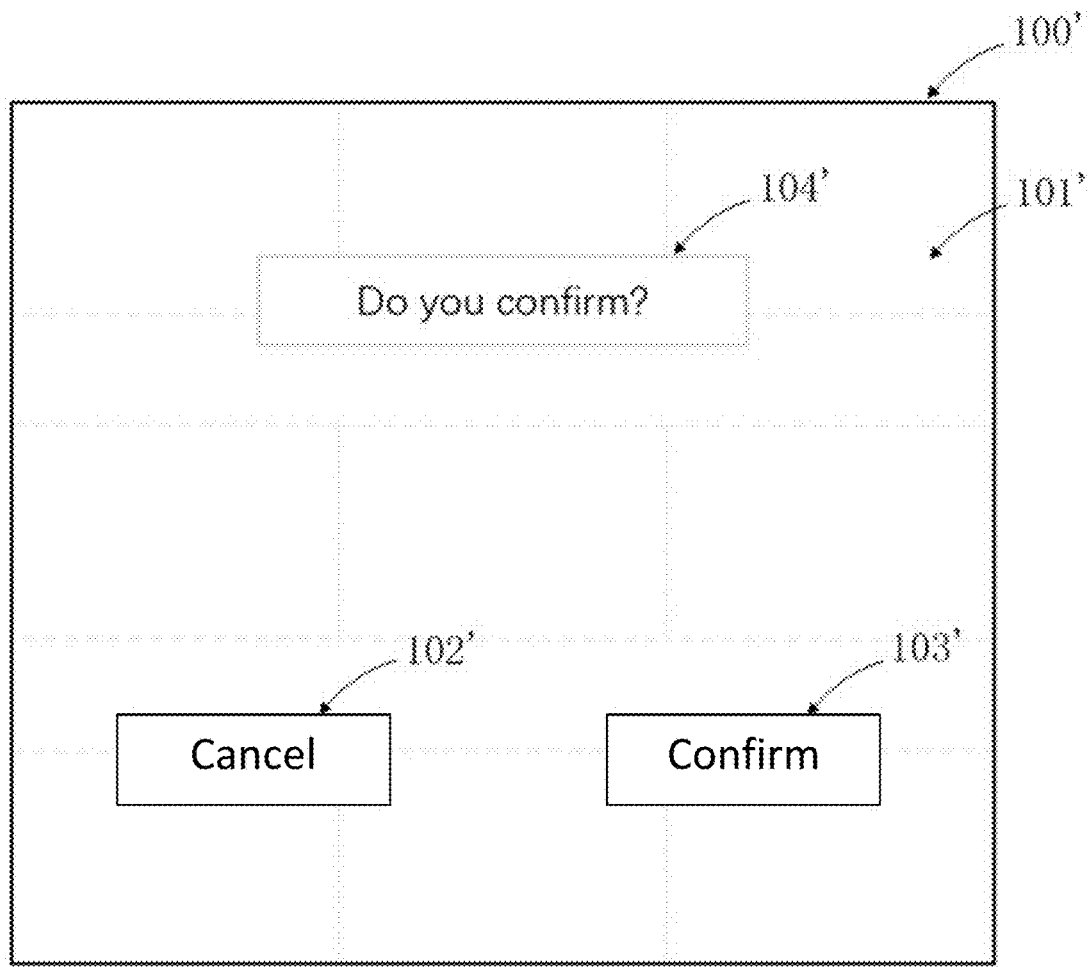

As shown in FIGS. 1G and 1H, the adaptive user interface component 102' is placed in the corresponding area 7 of the adaptive panel 101', the adaptive user interface component 103' is placed in the corresponding area 9 of the adaptive panel 101', and the adaptive user interface component 104' is placed in the corresponding area 2 of the adaptive panel 101', to generate an adaptive user interface 100'.

Optionally, the adaptive user interface 100' may include information of the user interface components 102', 103', 104' such as ID, category, color, size, content, and position.

Through step 206, an adaptive user interface can be generated. One or more adaptive user interface components in the adaptive user interface and one or more user interface components in the user interface can be placed in the same corresponding areas, and further, one or more adaptive user interface components in the adaptive user interface and one or more user interface components in the user interface may be placed at the same positions in the same corresponding areas.

Figure 3:
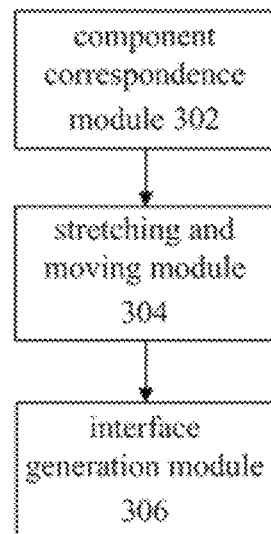
FIG. 3 is a schematic structural diagram of a system for adaptive configuration of a user interface.

A second embodiment of the present invention relates to a system for adaptive configuration of a user interface. FIG. 3 is a schematic structural diagram of a system for adaptive configuration of a user interface.

As shown in FIG. 3, a system 300 includes:
a component correspondence module 302, configured to respectively make a correspondence between one or more user interface components and one area of a plurality of areas of a panel;
a stretching and moving module 304, configured to perform a stretching operation on the plurality of areas and the one or more user interface components, and perform a moving operation on the plurality of areas, to generate an adaptive panel and one or more adaptive user interface components adapted to user equipment; and an interface generation module 306, configured to respectively place the one or more adaptive user interface components in corresponding areas of the adaptive panel to generate an adaptive user interface.

Optionally, the panel has N×M areas arranged in a manner of N×M, wherein N and M are both positive integers.

Optionally, the component correspondence module 302 is configured to: according to a center point of each user interface component, make a correspondence between the each user interface component and an area in which the center point is located.

Optionally, the stretching and moving module 304 is configured to: obtain a panel height and a panel width of the panel; obtain a screen height and a screen width of the user equipment; calculate a stretching ratio, wherein the stretching ratio is a smaller value in a ratio of the screen height to the panel height and a ratio of the screen width to the panel width; perform a stretching operation on the plurality of areas and the one or more user interface components according to the stretching ratio; if the ratio of the screen height to the panel height is less than the ratio of the screen width to the panel width, move the leftmost column area to the left to a screen edge of the user equipment, and move the rightmost column area to the right to a screen edge of the user equipment, to generate an adaptive panel and one or more adaptive user interface components adapted to the user equipment; and if the ratio of the screen height to the panel height is greater than the ratio of the screen width to the panel width, move the first row area up to a screen edge of the user equipment, and move the last row area down to a screen edge of the user equipment, to generate an adaptive panel and one or more adaptive user interface components adapted to the user equipment.

Optionally, the component correspondence module 302 is configured to: when the correspondence between the one or more user interface components and one area in the plurality of areas of the panel is respectively made, determine a positional relationship between a center point of each user interface component and a corresponding area; and the interface generation module 306 is configured to: according to the positional relationship, place a center point of each adaptive user interface component in a corresponding area of the adaptive panel to generate the adaptive user interface.

The first embodiment is a method embodiment corresponding to this embodiment, and this embodiment can be implemented in cooperation with the first embodiment. The related technical details mentioned in the first embodiment are still valid in this embodiment. In order to reduce repetition, details are not described herein. Correspondingly, the related technical details mentioned in this embodiment can also be applied in the first embodiment.

A third embodiment of the present invention relates to a device for adaptive configuration of a user interface. The device includes a memory in which an instruction is stored and a processor. The processor is configured to execute the instruction to implement a method for adaptive configuration of a user interface. The user interface includes a panel and one or more user interface components placed on the panel. The method includes:
  respectively making a correspondence between the one or more user interface components and one area in a plurality of areas of the panel;
  performing a stretching operation on the plurality of areas and the one or more user interface components, and performing a moving operation on the plurality of areas, to generate an adaptive panel and one or more adaptive user interface components adapted to user equipment; and
  respectively placing the one or more adaptive user interface components in corresponding areas of the adaptive panel to generate an adaptive user interface.

A fourth embodiment of the present invention relates to a computer storage medium encoded with a computer program. The computer program includes an instruction, and the instruction is executed by one or more computer to implement a method for adaptive configuration of a user interface. The user interface includes a panel and one or more user interface components placed on the panel. The method includes:
  respectively making a correspondence between the one or more user interface components and one area in a plurality of areas of the panel;
  performing a stretching operation on the plurality of areas and the one or more user interface components, and performing a moving operation on the plurality of areas, to generate an adaptive panel and one or more adaptive user interface components adapted to user equipment; and
  respectively placing the one or more adaptive user interface components in corresponding areas of the adaptive panel to generate an adaptive user interface.

The first embodiment is a method embodiment corresponding to this embodiment, and this embodiment can be implemented in cooperation with the first embodiment. The related technical details mentioned in the first embodiment are still valid in this embodiment. In order to reduce repetition, details are not described herein. Correspondingly, the related technical details mentioned in this embodiment can also be applied in the first embodiment.

It should be noted that each method embodiment of the present invention can be implemented in software, hardware, firmware, and other manners. Regardless of whether the present invention is implemented in software, hardware, or firmware, instruction codes can be stored in any type of computer-accessible memory (for example, a permanent or modifiable, volatile or non-volatile, solid-state or non-solid, fixed or replaceable medium, etc.). Similarly, the memory may be, for example, programmable array logic ("PAL"), a random access memory ("RAM"), and a programmable read-only memory ("PROM"), a read-only memory ("ROM"), an electrically erasable programmable read-only memory ("EEPROM"), a magnetic disk, an optical disc, and a digital versatile disc ("DVD").

It should be noted that the units/modules mentioned in the device embodiments of this application are logical units/modules. Physically, a logical unit/module may be a physical unit or may be a part of a physical unit, or may be implemented as a combination of multiple physical units. The physical implementation of these logical units is not the most important. The combination of the functions implemented by these logical units is the key to solving the technical problem presented in this application. In addition, in order to highlight the innovation part of this application, the above device embodiments of this application do not introduce units that are not closely related to solving the technical problems raised by this application, and this does not mean that there are no other units in the above device embodiments.

It should be noted that in the claims and the description of this application, relational terms such as "first" and "second" are only used to distinguish one entity or operation from another entity or operation, and do not necessarily require or imply that there is any such actual relationship or order between these entities or operations. Moreover, the terms "comprise", "include" or any other variants thereof are intended to cover the non-exclusive inclusion, so that a process, method, product, or device that includes a list of elements not only includes those elements but also includes other elements that are not expressly listed, or further includes elements inherent to such a process, method, article, or device. An element defined by "includes a . . . " does not, without more constraints, preclude the existence of additional identical elements in the process, method, product, or device that includes the element.

Although this application has been illustrated and described by reference to some preferred embodiments of this application, a person of ordinary skill in the art should understand that various changes can be made in form and detail without departing from the spirit and scope of this application.

The invention claimed is:

1. A method for adaptive configuration of a user interface, the user interface comprising a panel and one or more user interface components placed on the panel, wherein the panel is partitioned into a plurality of areas, and wherein the method comprises:
  respectively making a correspondence between the one or more user interface components and one area of the plurality of areas of the panel;
  performing a stretching operation on the plurality of areas and the one or more user interface components, and performing a moving operation on the plurality of areas, to generate an adaptive panel and one or more adaptive user interface components adapted to user equipment; and
  according to the correspondence between the one or more user interface components and one area of the plurality of areas of the panel, respectively placing the one or more adaptive user interface components in corresponding areas of the adaptive panel to generate an adaptive user interface, wherein the respectively placing the one or more adaptive user interface components in corresponding areas of the adaptive panel to generate an adaptive user interface comprises:

when the correspondence between the one or more user interface components and one area of the plurality of areas of the panel is respectively made, determining a positional relationship between every center point of each user interface component and a corresponding area, wherein a positional relationship between every center point of each user interface component and a corresponding area comprises percentage coordinates of the center point in the corresponding area; and according to the positional relationship, placing every center point of each adaptive user interface component in a corresponding area of the adaptive panel to generate the adaptive user interface.

2. The method according to claim 1, wherein the panel has N×M areas arranged in a manner of N×M, wherein N and M are both positive integers.

3. The method according to claim 1, wherein the respectively making a correspondence between the one or more user interface components and one area of the plurality of areas of the panel comprises:

according to every center point of each user interface component, making a correspondence between the each user interface component and an area in the panel in which the center point is located.

4. The method according to claim 1, wherein the performing a stretching operation on the plurality of areas and the one or more user interface components, and performing a moving operation on the plurality of areas to generate an adaptive panel and one or more adaptive user interface components adapted to user equipment comprises:

obtaining a panel height and a panel width of the panel;
obtaining a screen height and a screen width of the user equipment;
calculating a stretching ratio, wherein the stretching ratio is a smaller value of a ratio of the screen height to the panel height and a ratio of the screen width to the panel width;
performing a stretching operation on the plurality of areas and the one or more user interface components according to the stretching ratio;
if the ratio of the screen height to the panel height is less than the ratio of the screen width to the panel width, moving the leftmost column area to the left to a screen edge of the user equipment, and moving the rightmost column area to the right to a screen edge of the user equipment, to generate an adaptive panel and one or more adaptive user interface components adapted to the user equipment;
if the ratio of the screen height to the panel height is greater than the ratio of the screen width to the panel width, moving the first row area up to a screen edge of the user equipment, and moving the last row area down to a screen edge of the user equipment, to generate an adaptive panel and one or more adaptive user interface components adapted to the user equipment, and if the ratio of the screen height to the panel height is equal to the ratio of the screen width to the panel width, not performing the moving operation on the plurality of areas.

5. A system for adaptive configuration of a user interface, the user interface comprising a panel and one or more user interface components placed on the panel, wherein the panel is partitioned into a plurality of areas, and wherein the system comprises:

one or more processors; and
a memory that stores instructions that, when executed by the one or more processors, causes the one or more processors to perform operations comprising:
respectively making a correspondence between the one or more user interface components and one area of the plurality of areas of the panel;
performing a stretching operation on the plurality of areas and the one or more user interface components, and performing a moving operation on the plurality of areas, to generate an adaptive panel and one or more adaptive user interface components adapted to user equipment; and
according to the correspondence between the one or more user interface components and one area of the plurality of areas of the panel, respectively placing the one or more adaptive user interface components in corresponding areas of the adaptive panel to generate an adaptive user interface,
wherein the respectively placing the one or more adaptive user interface components in corresponding areas of the adaptive panel to generate an adaptive user interface comprises:
when the correspondence between the one or more user interface components and one area of the plurality of areas of the panel is respectively made, determining a positional relationship between every center point of each user interface component and a corresponding area, wherein a positional relationship between every center point of each user interface component and a corresponding area comprises percentage coordinates of the center point in the corresponding area; and
according to the positional relationship, placing every center point of each adaptive user interface component in a corresponding area of the adaptive panel to generate the adaptive user interface.

6. The system according to claim 5, wherein the panel has N×M areas arranged in a manner of N×M, wherein N and M are both positive integers.

7. The system according to claim 5, wherein the performing a stretching operation on the plurality of areas and the one or more user interface components, and performing a moving operation on the plurality of areas, to generate an adaptive panel and one or more adaptive user interface components adapted to user equipment comprises:

obtaining a panel height and a panel width of the panel;
obtaining a screen height and a screen width of the user equipment;
calculating a stretching ratio, wherein the stretching ratio is a smaller value of a ratio of the screen height to the panel height and a ratio of the screen width to the panel width;
performing a stretching operation on the plurality of areas and the one or more user interface components according to the stretching ratio;
if the ratio of the screen height to the panel height is less than the ratio of the screen width to the panel width, moving the leftmost column area to the left to a screen edge of the user equipment, and moving the rightmost column area to the right to a screen edge of the user equipment, to generate an adaptive panel and one or more adaptive user interface components adapted to the user equipment;

if the ratio of the screen height to the panel height is greater than the ratio of the screen width to the panel width, moving the first row area up to a screen edge of the user equipment, and moving the last row area down to a screen edge of the user equipment, to generate an adaptive panel and one or more adaptive user interface components adapted to the user equipment; and if the ratio of the screen height to the panel height is equal to the ratio of the screen width to the panel width, not performing the moving operation on the plurality of areas.

8. A non-transitory computer storage medium encoded with a computer program, wherein the computer program comprises an instruction, the instruction is executed by one or more computers to implement a method for adaptive configuration of a user interface, where the user interface comprises a panel and one or more user interface components placed on the panel, the panel is partitioned into a plurality of areas, and the method comprises:

respectively making a correspondence between the one or more user interface components and one area of the plurality of areas of the panel;

performing a stretching operation on the plurality of areas and the one or more user interface components, and performing a moving operation on the plurality of areas, to generate an adaptive panel and one or more adaptive user interface components adapted to user equipment; and according to the correspondence between the one or more user interface components and one area of the plurality of areas of the panel, respectively placing the one or more adaptive user interface components in corresponding areas of the adaptive panel to generate an adaptive user interface, wherein the respectively placing the one or more adaptive user interface components in corresponding areas of the adaptive panel to generate an adaptive user interface comprises:

when the correspondence between the one or more user interface components and one area of the plurality of areas of the panel is respectively made, determining a positional relationship between every center point of each user interface component and a corresponding area, wherein a positional relationship between every center point of each user interface component and a corresponding area comprises percentage coordinates of the center point in the corresponding area; and according to the positional relationship, placing every center point of each adaptive user interface component in a corresponding area of the adaptive panel to generate the adaptive user interface.

* * * * *